(12) United States Patent
Heics

(10) Patent No.: US 11,960,702 B2
(45) Date of Patent: *Apr. 16, 2024

(54) METHOD AND SYSTEM FOR ELEMENT NAVIGATION

(71) Applicant: D2L Corporation, Kitchener (CA)

(72) Inventor: Colin Heics, Kitchener (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/180,052

(22) Filed: Feb. 19, 2021

(65) Prior Publication Data

US 2021/0173534 A1 Jun. 10, 2021

Related U.S. Application Data

(63) Continuation of application No. 14/964,713, filed on Dec. 10, 2015, now Pat. No. 10,963,126.

(60) Provisional application No. 62/090,025, filed on Dec. 10, 2014.

(51) Int. Cl.
 G06F 3/0482 (2013.01)
 G06F 3/0488 (2022.01)

(52) U.S. Cl.
 CPC .......... *G06F 3/0482* (2013.01); *G06F 3/0488* (2013.01)

(58) Field of Classification Search
 CPC .................. G06F 3/0482; G06F 3/0488
 See application file for complete search history.

(56) References Cited

U.S. PATENT DOCUMENTS

| | | | |
|---|---|---|---|
| 6,317,128 B1 | 11/2001 | Harrison et al. | |
| 7,992,102 B1* | 8/2011 | De Angelo | G06F 3/04886 715/834 |
| 8,028,250 B2* | 9/2011 | Vronay | G06F 3/0482 715/848 |
| 9,396,327 B2 | 7/2016 | Auger et al. | |
| 9,418,090 B2 | 8/2016 | Auger | |
| 9,785,341 B2 | 10/2017 | Stallings et al. | |
| 9,965,136 B1 | 5/2018 | Brichter et al. | |
| 2001/0043238 A1 | 11/2001 | Guerrero | |
| 2003/0004638 A1* | 1/2003 | Villers | G06F 3/0482 701/431 |
| 2003/0197744 A1 | 10/2003 | Irvine | |
| 2004/0100479 A1 | 5/2004 | Nakano et al. | |

(Continued)

*Primary Examiner* — William L Bashore
*Assistant Examiner* — Nathan K Shrewsbury
(74) *Attorney, Agent, or Firm* — Amarok IP Inc.; Neil W. Henderson

(57) ABSTRACT

A method and system for element navigation. The method includes: selecting a designated element from a plurality of elements; displaying the designated element on a display of an electronic device; monitoring for a predetermined primary user input from an input module; and upon receiving the predetermined primary user input, displaying an initial set of elements related to the designated element overlaid on the display of the designated element. The system includes: an element display module configured to display a designated element on an electronic device, the designated element selected from a plurality of elements; an input module configured to receive a predetermined primary user input; and a set display module configured to display an initial set of elements related to the designated element upon the input module receiving the predetermined primary user input, the initial set of elements overlaid on the display of the designated element.

18 Claims, 11 Drawing Sheets

(56) References Cited

U.S. PATENT DOCUMENTS

| | | | |
|---|---|---|---|
| 2005/0131945 A1* | 6/2005 | Muller | G06F 9/451 |
| 2006/0005124 A1 | 1/2006 | Speicher | |
| 2006/0036568 A1 | 2/2006 | Moore et al. | |
| 2006/0242121 A1 | 10/2006 | DeVorchik et al. | |
| 2006/0242122 A1 | 10/2006 | DeVorchik et al. | |
| 2006/0242164 A1 | 10/2006 | Evans et al. | |
| 2007/0214434 A1 | 9/2007 | Rydenhag | |
| 2007/0226187 A1 | 9/2007 | Beatty et al. | |
| 2008/0059913 A1* | 3/2008 | Burtner | G06F 3/0482 |
| | | | 715/854 |
| 2008/0072177 A1* | 3/2008 | Santos | G06F 3/0482 |
| | | | 715/821 |
| 2008/0122796 A1 | 5/2008 | Jobs et al. | |
| 2008/0165141 A1* | 7/2008 | Christie | G06F 3/0482 |
| | | | 345/173 |
| 2008/0294680 A1 | 11/2008 | Powell et al. | |
| 2009/0259959 A1 | 10/2009 | Grotjohn et al. | |
| 2010/0077355 A1* | 3/2010 | Belinsky | G06F 3/0482 |
| | | | 715/835 |
| 2010/0083172 A1 | 4/2010 | Breeds et al. | |
| 2010/0251165 A1 | 9/2010 | Williams | |
| 2011/0078560 A1* | 3/2011 | Weeldreyer | G06F 40/166 |
| | | | 715/255 |
| 2011/0113314 A1 | 5/2011 | Greer et al. | |
| 2011/0209102 A1* | 8/2011 | Hinckley | G06F 1/1641 |
| | | | 345/173 |
| 2012/0066647 A1 | 3/2012 | Ullmann | |
| 2012/0089950 A1 | 4/2012 | Tseng | |
| 2012/0159365 A1* | 6/2012 | Cragun | G06F 9/451 |
| | | | 715/767 |
| 2012/0331423 A1 | 12/2012 | Kumamoto | |
| 2013/0014006 A1* | 1/2013 | Abellera | G06F 3/04817 |
| | | | 715/744 |
| 2013/0044114 A1 | 2/2013 | Burtner et al. | |
| 2013/0106903 A1* | 5/2013 | Nagata | G06F 3/04883 |
| | | | 345/619 |
| 2013/0191757 A1 | 7/2013 | Smith et al. | |
| 2014/0013276 A1* | 1/2014 | Butterworth | G06F 3/0488 |
| | | | 715/821 |
| 2014/0108981 A1* | 4/2014 | Payzer | G06F 3/0481 |
| | | | 715/767 |
| 2014/0282013 A1* | 9/2014 | Amijee | G06F 3/0482 |
| | | | 715/732 |
| 2014/0298267 A1 | 10/2014 | Chan et al. | |
| 2014/0337751 A1* | 11/2014 | Lim | G06F 40/279 |
| | | | 715/744 |
| 2014/0358913 A1 | 12/2014 | Cai et al. | |
| 2015/0019982 A1 | 1/2015 | Petitt, Jr. et al. | |
| 2015/0046882 A1 | 2/2015 | Menyhart et al. | |
| 2015/0100881 A1 | 4/2015 | Nakajima et al. | |
| 2015/0161717 A1 | 6/2015 | Mumm et al. | |
| 2015/0193138 A1* | 7/2015 | Relyea | G06F 3/04812 |
| | | | 715/823 |
| 2016/0065505 A1* | 3/2016 | Iskander | H04L 51/42 |
| | | | 715/752 |
| 2016/0246473 A1* | 8/2016 | Jobs | G06F 3/04883 |
| 2017/0090695 A1 | 3/2017 | Pierce et al. | |
| 2018/0146090 A1 | 5/2018 | Lavian et al. | |

\* cited by examiner

METHOD AND SYSTEM FOR ELEMENT NAVIGATION

RELATED APPLICATIONS

This application is a continuation of U.S. patent application Ser. No. 14/964,713 filed on Dec. 10, 2015, which claims priority to U.S. Provisional Application No. 62/090,025 filed on Dec. 10, 2014, the content of both of which are hereby incorporated herein by reference.

FIELD

The present disclosure relates generally to computer navigation. More particularly, the present disclosure relates to a method and system for element navigation on a display of an electronic device.

BACKGROUND

Electronic content is typically made up of various elements. Elements may include various types of electronic content; for example, data, files, e-mails, documents, database entries, automatically inputted data, manually inputted data, outputted data, or the like. Elements of electronic content are often structured in a list organization. An example of a type of conventional list structure is a finite collection of elements organized in a consecutive sequence. Another example of a type of list structure is a hierarchical organization. A hierarchical organization typically consists of a structure in which each element or group of elements, except for at least one element, is subordinate to at least one other element or group of elements. The hierarchy may have one or more levels branching originally from the top element or group of elements.

After an element is displayed on an electronic device, navigating elements of a list may present usability challenges. Conventionally, the user may either display an element of the list or navigate the list. However, a user may wish to navigate among elements in a different way. As such, there is a need for an improved method of element navigation.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a method for element navigation, the method includes: selecting a designated element from a plurality of elements; displaying the designated element on a display of an electronic device; monitoring for a predetermined primary user input from an input module; and upon receiving the predetermined primary user input, displaying an initial set of elements related to the designated element overlaid on the display of the designated element.

In a particular case, the plurality of elements includes a list of elements, and the initial set of elements related to the designated element includes a subset of elements from the list of elements.

In another case, receiving the predetermined primary user input includes receiving an input originating from a first predetermined region of the display and ending in a second predetermined region of the display.

In yet another case, the method further includes: monitoring for a predetermined secondary user input; and upon receiving the predetermined secondary user input, performing a secondary action related to the set of elements.

In a further case, the secondary action is selected from the group consisting of: ceasing display of the initial set of elements; ceasing display of the initial set of elements and of the designated element, and displaying a newly selected element as the new designated element, the selected element selected by the predetermined secondary user input; and ceasing display of the initial set of elements and displaying a new set of elements.

In a further case, the plurality of elements include a hierarchical structure of elements and wherein displaying a new set of elements comprises displaying elements from a different level of the hierarchy than the initial subset of elements.

In a further case, the plurality of elements include a list of elements, and the initial set of elements include a subset of elements from the list of elements, and wherein the new set of elements are adjacent elements in the list of elements to the initial set of elements.

In yet another case, displaying the set of elements further includes displaying predetermined metadata about each element of the set of elements.

In a further case, the metadata includes a predetermined status indicator related to a task related to the plurality of elements.

In yet another case, displaying the set of elements further includes: retrieving predetermined selection criteria for selecting the initial set of elements; and displaying the set of elements based on the selection criteria.

In a further case, the predetermined selection criteria is selected from the group consisting of user preferences, relevancy, historical usage, and contextual usage.

In yet another case, displaying a new set of elements includes changing the number of elements displayed compared to the initial set of elements.

In a further case, changing the number of elements displayed includes: retrieving predetermined display criteria for selecting the number of elements displayed; and displaying the set of elements based on the display criteria.

In a further case, the display criteria is selected from the group consisting of user preferences, relevancy, historical usage, display size, display resolution and metadata quantity.

In another aspect, there is provided a system for element navigation, the system includes: an element display module configured to display a designated element on an electronic device, the designated element selected from a plurality of elements; an input module configured to receive a predetermined primary user input; and a set display module configured to display an initial set of elements related to the designated element upon the input module receiving the predetermined primary user input, the initial set of elements overlaid on the display of the designated element.

In a particular case, the plurality of elements includes a list of elements, and the initial set of elements related to the designated element includes a subset of elements from the list of elements.

In another case, the input module receives the predetermined primary user input when an input originating from a first predetermined region of a display and ending in a second predetermined region of the display.

In yet another case, the set display module is further configured to display predetermined metadata about each element of the set of elements.

In yet another case, the input module is further configured to receive a predetermined secondary user input, and upon receiving the predetermined secondary user input, the element display module, the set display module, or both, perform a secondary action.

In a further case, the secondary action is selected from the group consisting of: the set display module ceasing display of the initial set of elements; the set display module ceasing display of the initial set of elements and the element display module ceasing display of the designated element, and the element display module displaying a selected element as the designated element, the selected element selected by the predetermined secondary user input; and the set display module ceasing display of the initial set of elements and displaying a new set of elements.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

Figure 1:
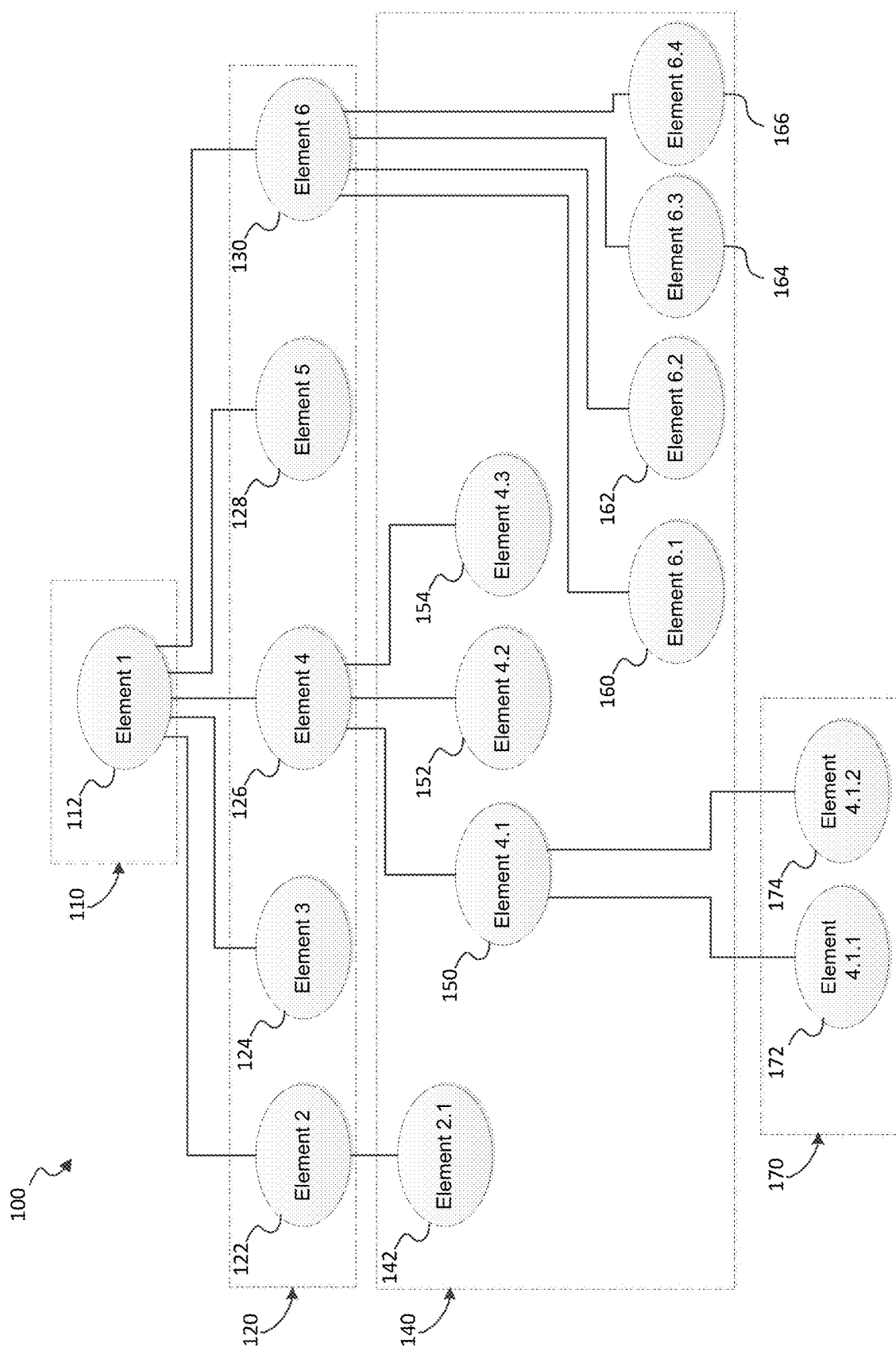
FIG. 1 illustrates an example of hierarchical element organization.

The following description with reference to the accompanying drawings is provided to assist in a comprehensive understanding of example embodiments as defined by the claims and their equivalents. The following description includes various specific details to assist in that understanding but these are to be regarded as merely examples. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not intended to be limited to the bibliographical meanings, but, are merely used by the inventor to enable a clear and consistent understanding. Accordingly, it should be apparent to those skilled in the art that the following description of embodiments is provided for illustration purpose only and not for the purpose of limiting the invention as defined by the appended claims and their equivalents.

Generally, the present disclosure provides a method and system for element navigation allowing for display of a subset of elements. In particular, the embodiments of the system and method detailed herein provide for a subset of elements to be navigable while a designated element is displayed.

Sets, or collections, of elements may include various types of electronic content. Particularly, it may include any set of data that can be stored in electronic form, such as files, e-mails, documents, database entries, automatically inputted data, manually inputted data, outputted data, or the like. In general, at least a portion of the data of each element will be data that is to be displayed to a user on a display; for example, a screen of an electronic device.

It is generally advantageous to structure the sets of elements so that the sets are in a navigable organization. The organization may take any form, with the two most common being list structures having either a consecutive sequence of elements or a hierarchy of elements. A consecutive sequence may or may not be in a preset order; for example, chronological, alphabetical, or the like. A hierarchy is usually organized such that each element or group of elements, except for at least one 'top-level' element, is subordinate to at least one other element or group of elements. The hierarchy may have one or more levels branching directly or indirectly from the at least one 'top-level' element.

In navigating among elements, a designated element is the element currently selected from the set of elements. The designated element may be selected by a user, as will be described, or selected automatically by a processor based on predetermined criteria. The designated element may change to a different element from the set of elements based on subsequent selections made by the user. The system may, or may not, select a designated element upon initialization. In the present disclosure, displaying the designated element also refers to displaying at least a portion of the data or content associated with the designated element to the user on the display.

The systems and methods described herein are intended to provide the advantage of being able to traverse the organization of elements of a list in such a way that a designated element of the list is displayed while a subset of elements of the list is also navigable. A user may use data displayed by the designated element as context for searching, examining and/or choosing elements from the navigable subset of elements. The user may also use the data displayed in the navigable subset of elements to understand, contextualize and/or edit the designated element. As an example, it would be advantageous to have the elements adjacent to the designated element, or having the elements with similar characteristics to the designated element, be navigable while the designated element is displayed.

FIG. 1 is an example illustration of a list of elements 100 in a hierarchical structure. In this case, there is one root element 112, located at the first level 110 of the hierarchy, from which all other elements branch, either directly or indirectly. The second level 120 consists of a subset of elements, Elements 2 to 6 122, 124, 126, 128 and 130, that branch from the root element 112. The third level 140 consists of a subset of elements that branch from one of the elements in the second level 120. In this case, Element 2.1 142 branches from Element 2 122, Elements 4.1 to 4.3 150, 152 and 154 branch from Element 4 126, and Elements 6.1 to 6.4 160, 162, 164 and 166 branch from Element 6 130. As well, there is a third level 170 which branches from Element 4.1 150 with one subset of elements, Element 4.1.1 172 and Element 4.1.2 174.

It is an intended advantage of the embodiments herein to be able to traverse the organization of elements 100 of the hierarchy in such a way that a designated element of the hierarchy is displayed while a subset of elements is also navigable. In a particular case, the subset of navigable elements has a rational connection, such as being the elements of a certain level of hierarchy (for example, Elements 6.1 to 6.4 160, 162, 164 and 166) or being all the elements that branching from a particular element (for example, Elements 4.1 to 4.3 150, 152 and 154 and Elements 4.1.1 to 4.1.2 172 and 174).

Figure 2:
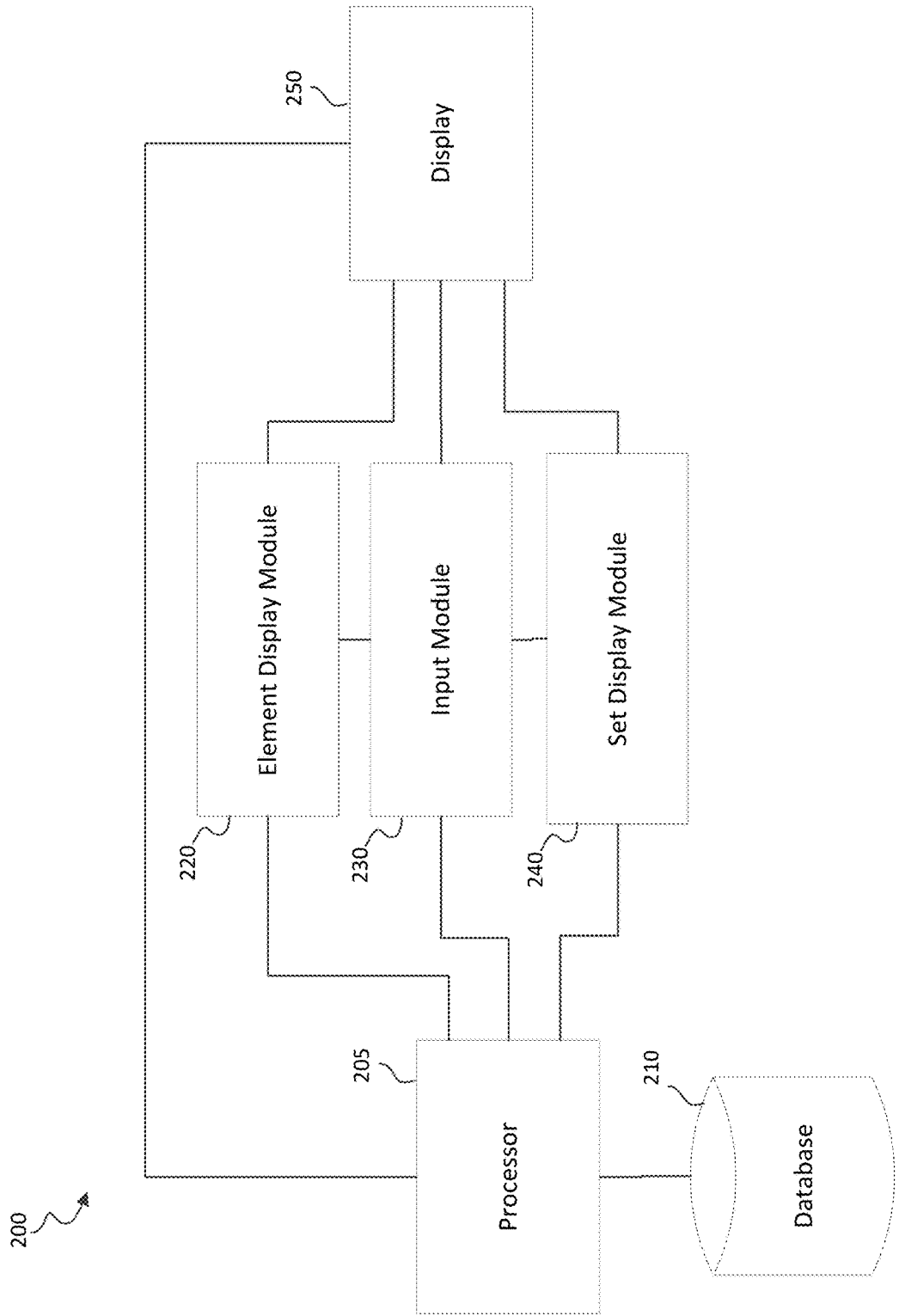
FIG. 2 illustrates a system for element navigation according to an embodiment.

FIG. 2 illustrates an embodiment of a system 200 for element navigation according to an embodiment. The system 200 includes a processor 205, a database 210 operatively connected with the processor 205, an element display module 220, an input module 230, a set display module 240 and a display 250.

The processor 205 is configured to operatively connect with and execute the instructions of the modules 220, 230, 240 and provide instructions to the display 250. In some cases, each module may include a separate processor. In other cases, the system 200 may be a component within an electronic device, and the processor 205 may be a central processing unit for the electronic device. The electronic device may be network-enabled such that system 200 or the processor 205 communicates with a network (not shown).

Generally speaking, the processor 205 is configured to interact with the database 210. The database 210 may generally be any electronic storage medium known in the art. In some cases, the database 210 may be a component of one of the modules. In other cases, the database 210 may be an operable combination of two or more databases. The database 210 may be automatically managed, managed by one or more users, managed by one or more administrators, or the like.

The database 210 is configured to store data that includes at least one set of elements. In some cases, the database 210 may also store the organization or structure of the at least one set of elements. In other cases, the data pertaining to the organization or structure of the elements can be computed by the processor 205 or inputted via the input module 230.

The element display module 220 is configured to display a designated element from the set of elements. The designated element may be any element from the set of elements. The designated element may be selected based on various selection practices; for example, previously selected from the set of elements, selected automatically based on preferences, selected automatically based on a set of rules, or selected due to its position in a list. The display 250 is suitable for displaying the designated element and may be, for example, a monitor, a touchscreen, a mobile device screen, a television, an electronic paper screen, or the like. All or a portion of the data associated with the designated element may be displayed. The portion of data to be displayed may be any displayable information, for example, the contents of an email, the details of an electronic file, or the like.

The input module 230 monitors for a predetermined primary user input from an input device (not shown); for example, a motion, a selection, a spoken command, or the like. The input may be received from any suitable input device, which may or may not be combined with the display 250; for example, a touchscreen, a mouse, a track-pad, a keyboard, a game controller, a motion tracker, an optical sensor, a microphone, or the like. Any predetermined inputs described herewith will generally include any input that can be distinguished from the typical operational inputs of the designated element.

In some cases, the predetermined primary user input will include a motion of the input device originating from a first predetermined region of the display 250 and ending in a second predetermined region of the display 250.

When the predetermined primary user input is received, the set display module 240 displays a subset of elements from the set of elements, also referred to as a menu of elements. The set display module 240 may display the subset of elements while the designated element is displayed such that the data or information displayed by the designated element remains at least partially accessible while the subset of elements is displayed.

Figure 3:
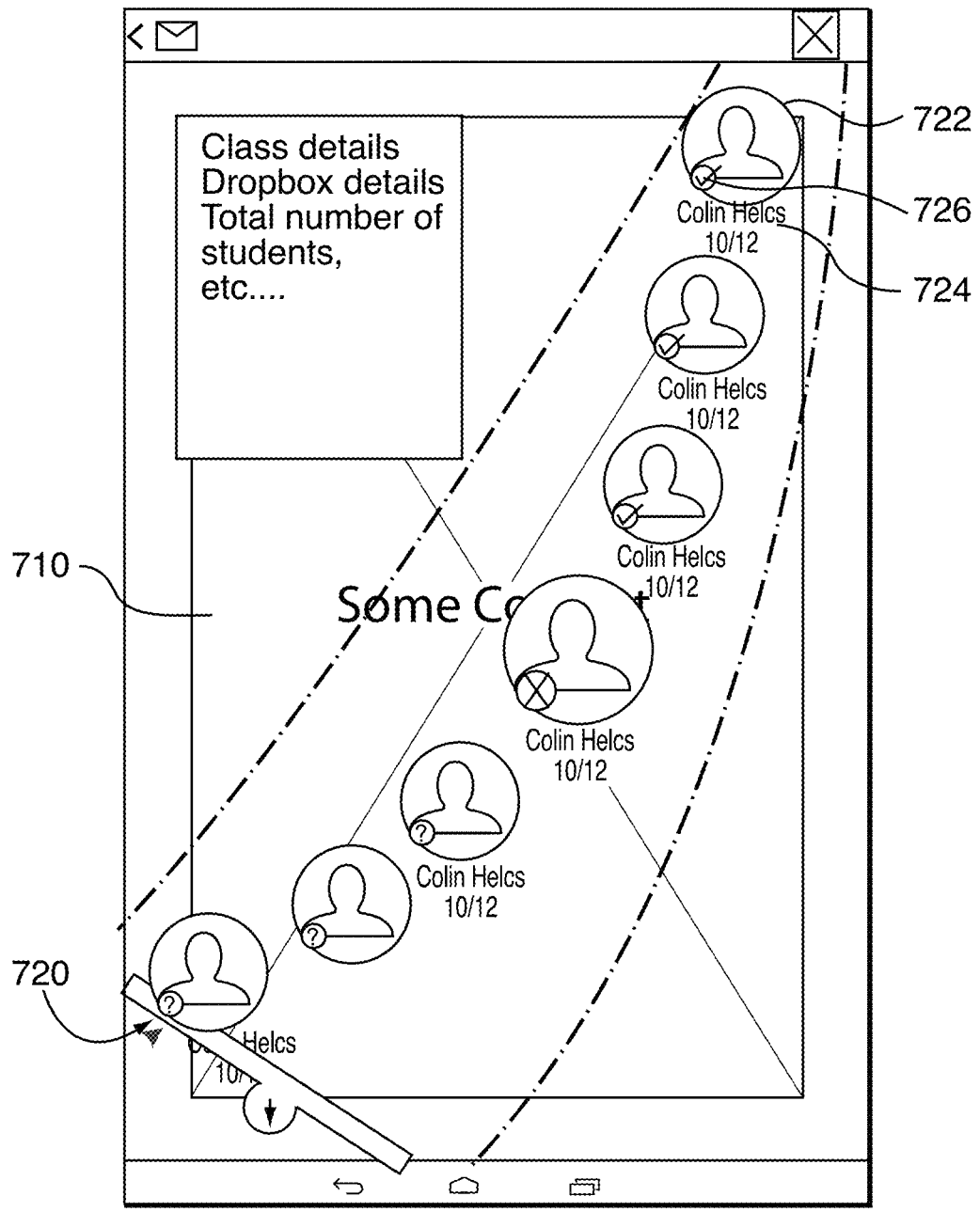
FIG. 3 illustrates an example of a subset of elements displayed for element navigation.

As illustrated in FIG. 3, the set display module 240 may display on the display 250 a subset of elements 720 in an appropriate representation, for example, as text, icons, symbols, pictures, a combination of text, icons, symbols or pictures, or the like. As well, the set display module 240 may display the subset of elements 720 in a suitable orientation which is intended to fit in the display 250.

FIG. 3 illustrates an example of the content of the designated element 710 remaining partially accessible while the subset of elements 720 is being displayed. This feature may have the intended advantage of having the designated element 710 partially accessible to allow for a more informed understanding, and possible selection, even while viewing the subset of elements 720.

In the example illustrated in FIG. 3, the set display module 240 displays the subset of elements 720 as icons 722 with associated metadata 724 displayed adjacent to the icon. In this example, the designated element 710 is a class in an educational context while the subset of elements is a consecutive sequence of students in the class. In this case, the icon 722 is a picture of the student and the metadata 724 are the student's name and birthdate. The metadata could further include, for example, the student's mark, the student's attendance, the student's address, the student's grade history, or the like. The set display module 240 also displays the subset of elements 720 with a condition indicator 726. In this example, the condition indicator 726 is either a checkmark, cross, or question mark indicating a condition of whether that element has been viewed. In this example, the subset of elements are oriented in a semicircular arc shape; however other element orientations may be used, such as lines, circles, waves, or the like.

The set display module 240 may further display metadata 724 related to one or more elements. For example, if the elements are emails, the metadata 724 may include the name of the sender, the date received, the size, or the like. The set display module 240 may also display the metadata 724 contextually, based on factors such as the designated element, historical usage, time of day, or the like.

In some cases, the set display module 240 may select which metadata to display based on, for example, preselected metadata preferences, predetermined conditions or factors, automatically, or the like. The metadata preferences, conditions or factors may be preselected by a user or be preselected based on system settings, or the like. The metadata preferences may be used to select which metadata is displayed as well as how much metadata is displayed. In other cases, the set display module 240 may change the metadata displayed based on a predetermined metadata input received from the input module 230; for example, receiving a long-press input from a touch screen around a particular element, receiving an input that a user is hovering over a particular element with a mouse pointer, or the like. In further cases, the metadata will only be displayed when the predetermined metadata input is received.

The set display module 240 may also display different types of condition indicators 726 to display various conditions related to a displayed element. For example, the condition indicator 726 may display, for example, elements in different colors, certain elements as flashing, elements with different sizes, elements in different positions on the display 250, or the like. The set display module 240 may display, with the condition indicator 726, one or more conditions concerning the element, for example, a read status of an element, a notification or warning, a category, or the like.

In some cases, the set display module 240 may determine which elements to display based on retrieved selection criteria. The selection criteria may be preselected by a user or retrieved from a database automatically. The selection criteria may be, for example, based on user preferences, relevancy, historical usage, contextual usage, or the like. In some cases, the set display module 240 will determine the number of elements to be displayed based on retrieved display criteria. The display criteria may be based on, for example, user preferences, relevancy, historical usage, display size, display resolution, metadata quantity, or the like.

In some other cases, when the input module 230 receives a predetermined secondary user input, the set display module 240 is configured to modify the subset of elements displayed; for example, if the input module 230 receives a 'swiping' motion input in the direction of the elements, the set display module 240 may substitute the current subset of elements for a new subset of elements that are adjacent in a consecutive sequence, adjacent in a level of hierarchy, adjacent in a branch of a hierarchy, or the like. In an example, the current subset of elements can be five emails in an inbox with consecutive times of reception. A swiping motion input in one direction may substitute the five emails currently displayed (current subset of elements) with five emails having the next five older times of reception (new subset of elements), while a swiping motion input in the other direction may substitute the five emails currently displayed (current subset of elements) with five emails having the next five newer times of reception (new subset of elements).

In another case, a 'swiping' motion input in a direction perpendicular to the elements may substitute the subset of elements for a subset of elements in a different level of a hierarchy. In an example, the current subset of elements can be five emails in an inbox that share a common conversation thread. A swiping motion input in a direction perpendicular to the elements may substitute the five emails currently displayed (current subset of elements) for five email conversation thread stems (new subset of elements).

In still other cases, when the input module 230 receives a predetermined element quantity user input, the set display module 240 will modify the number of elements in the subset of elements which is displayed. In an example, if the input module 230 receives a predetermined element quantity user input, for example a 'pinching' motion, the set display module 240 may display more elements in the subset of elements. Also, if the input module 230 receives a predetermined element quantity user input, for example a 'spreading' motion, the set display module 240 may display a different quantity of elements in the subset of elements. With changes in the number of elements in the subset, the set display module 240 may correspondingly modify the size of the elements or modify the amount of metadata displayed.

In some cases, the input module 230 may receive a predetermined selection input. The predetermined selection input may include a selection of one of the elements from the displayed subset of elements. The element display module 220 displays the electronic content from the selected element. In another case, upon the element display module 220 displaying the electronic content from the selected element, the set display module 240 ceases displaying the subset of elements.

In other cases, when the input module 230 receives the predetermined primary user input, the set display module 240 may only display the subset of elements for as long as the predetermined primary user input is sustained. In such a case, other inputs, such as the predetermined secondary user input, may be available through a second input; such as a second finger on a multi-touchscreen, or the like.

In a further case, when the input module 230 receives the predetermined primary user input, the set display module 240 may display the subset of elements until the input module 230 receives a predetermined "close" input. The predetermined close input may include receiving an input in a specific region of the display 250 or a specific input motion; for example, receiving an input in the top-right corner of the display 250, receiving a mouse click, receiving a touch on a touchscreen, or the like. Upon the input module 230 receiving the predetermined "close" input, the set display module 240 will cease displaying the subset of elements.

As an alternative, when the input module 230 receives the predetermined primary user input, the set display module 240 may display the subset of elements but the set display module 240 will only continue to display the subset of elements after the predetermined primary user input has ceased if the predetermined primary user input ended in a specific predetermined region of the display 250. In an example, if the predetermined primary user input starts in the top-right corner of the display 250 but ends in the middle region of the display 250, the set display module 240 may display the subset of elements for only as long as the predetermined primary user input is sustained. In a further case, if the predetermined primary user input starts in the top-right corner of the display 250 but ends in the bottom-left region of the display 250, past a predetermined threshold line or point, or into a threshold region, the set display module 240 may 'lock open' the display of elements and continue displaying the subset of elements after the predetermined primary user input has ceased. Then, the set display module 240 will cease displaying the subset of elements only upon the input module 230 receiving a predetermined "close" input.

Figure 4:
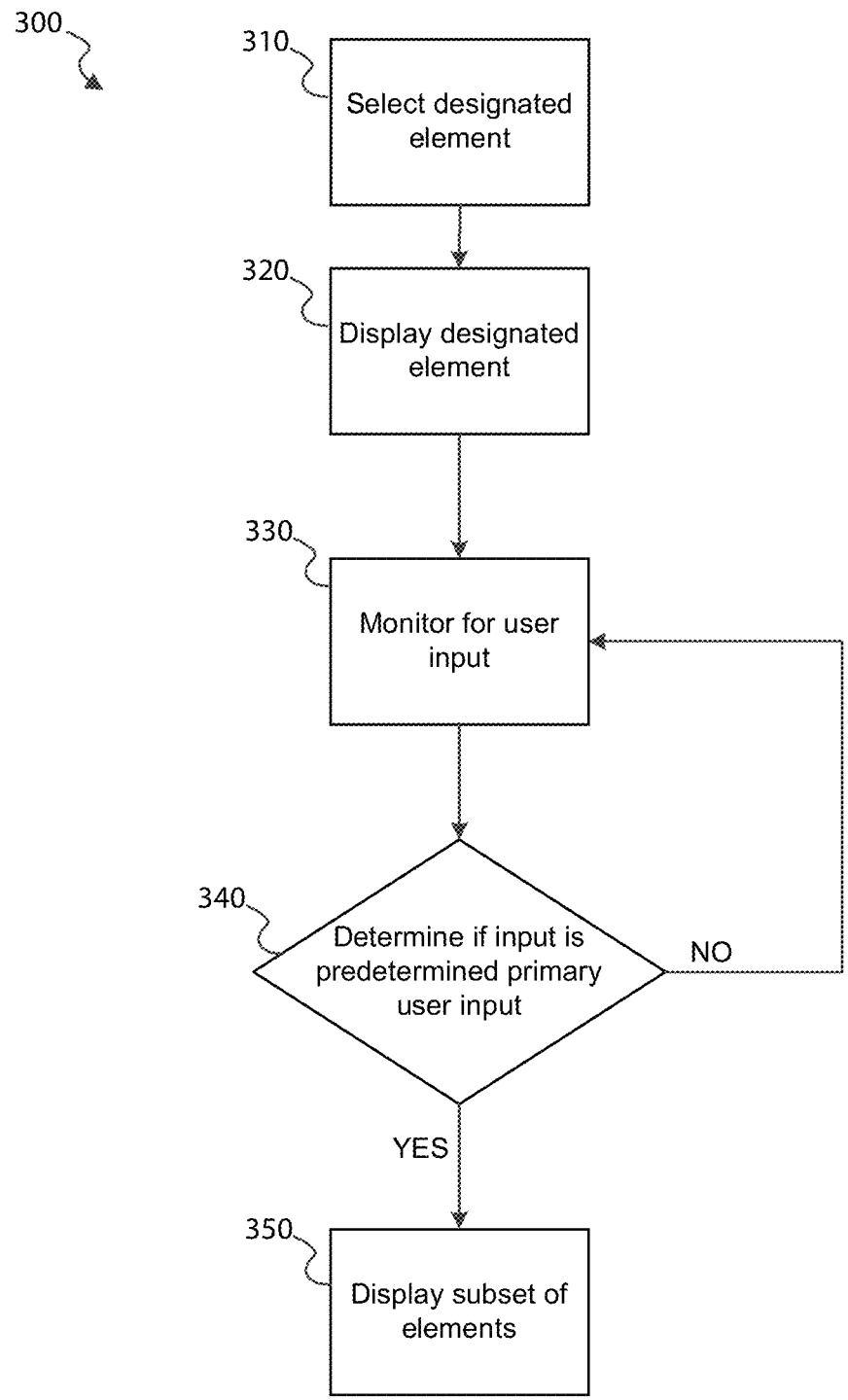
FIG. 4 is a flowchart illustrating a method for element navigation according to an embodiment.

FIG. 4 is a flowchart illustrating a method 300 for element navigation according to an embodiment.

At 310, a designated element is selected. The designated element may be selected by a user or selected automatically by a processor based on predetermined criteria. The predetermined criteria may be the first or last element in a list, may be the last viewed element, may be an element that has otherwise been indicated for action, or the like.

At 320, a designated element is displayed by the element display module 220. All or a portion of the data and metadata associated with the designated element is displayed by the element display module 220.

At 330, the input module 230 monitors for a user input from the input module 230.

At 340, the input module 230 determines whether the input received was a predetermined primary user input. In some cases, the predetermined primary user input may include a motion of the input device originating from a first predetermined region of the display 250 and ending in a second predetermined region of the display 250. If the input received was not the predetermined primary user input, then the input module 230 continues to monitor for the predetermined primary user input. It will be understood that other inputs may occur but that they will be handled by another input module or by other functions of the input module of the present embodiment.

At 350, if the input received by the input module 230 was the predetermined primary user input, the set display module 240 displays a subset of elements, from a set of elements, while the element display module 220 displays the designated element.

Figure 5:
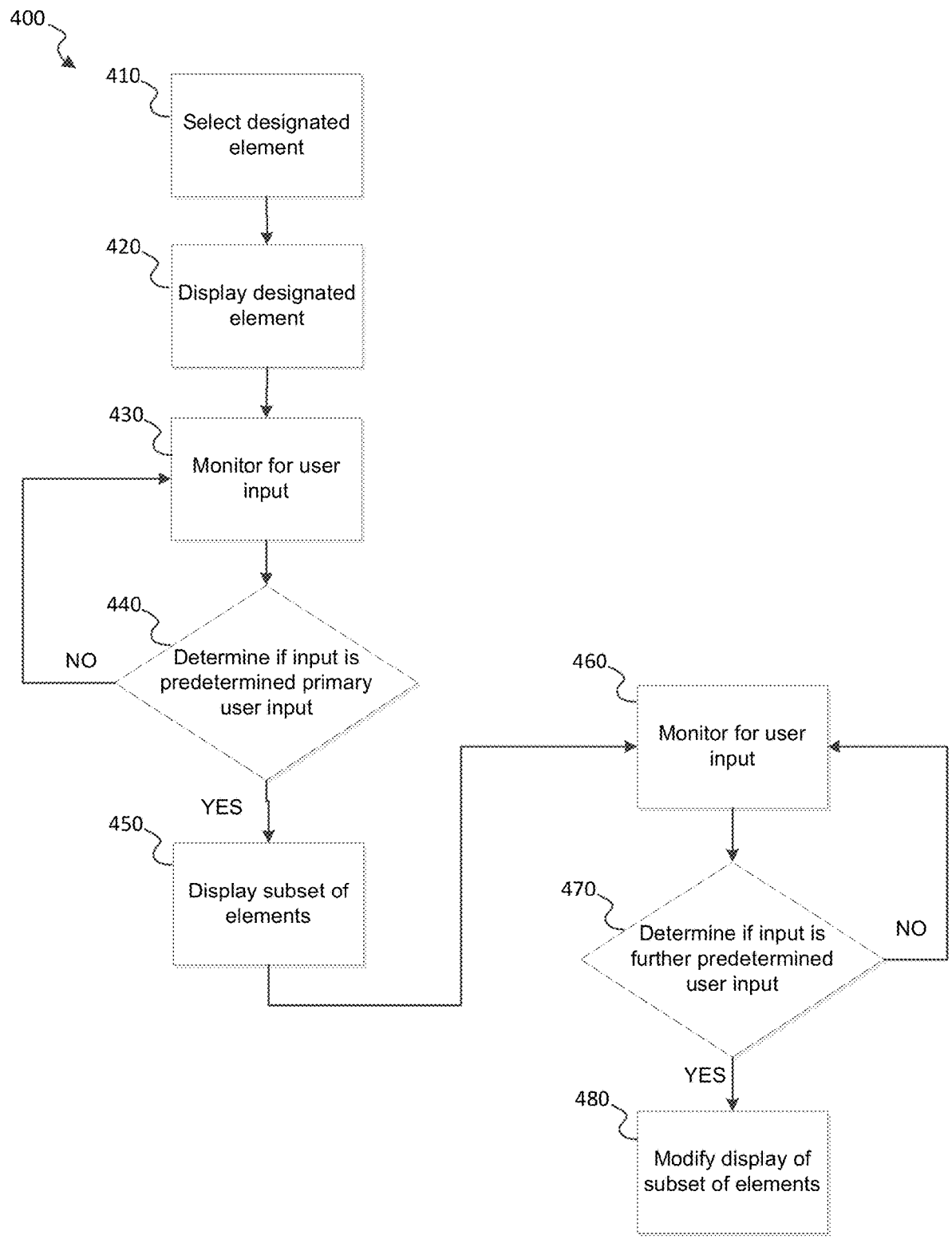
FIG. 5 is a flowchart illustrating a method for element navigation with further input according to another embodiment.

FIG. 5 is a flowchart illustrating a method 400 for element navigation with further input according to an embodiment.

At 410, a designated element from a list of elements is selected. The designated element may be selected by a user or selected automatically by a processor based on predetermined criteria.

At 420, the designated element is displayed by the element display module 220. At 430, the input module 230 monitors for a user input.

At 440, the input module 230 determines whether input received was a predetermined primary user input. If the input received was not the predetermined primary user input, then the input module 230 continues to monitor for a user input at 420.

At 450, if the input received by the input module 230 was the predetermined primary user input, the set display module 240 displays a subset of elements, from a set of elements, while the element display module 220 is displaying the designated element.

At 460, the input module 230 monitors for further user input. At 470, the input module 230 determines whether a further predetermined user input has been received. If the input received was not the further predetermined user input, then the input module 230 returns to monitoring for user input at 450.

At 480, if the input received by the input module 230 was the further predetermined user input, the set display module 240 modifies the display of the subset of elements.

In some cases, the further predetermined user input may be a predetermined user selection input. When the input module 230 determines that the predetermined user selection input has been received, the set display module 240 modifies the display of the subset of elements by ceasing display of the current subset of elements. Additionally, the element display module 220 may modify the current designated element to display data from the new designated element; whereby the new designated element is the element, from the current subset of elements, which was selected by the predetermined user selection input.

In other cases, the further predetermined user input may be a metadata request input and the set display module 240 may display metadata adjacent to each element in the subset of elements. The metadata request input may be, for example, a 'long press' on one of the elements of the subset of elements, or the like. When the input module 230 determines that the metadata request input has been received, the set display module 240 modifies the display of the subset of elements by modifying which metadata entries are displayed. In some cases, the set display module 240 may modify the display of the subset of elements to display more or less metadata when a metadata request input is received. In other cases, metadata may only be displayed once a metadata request input has been received.

In still other cases, the further predetermined user input may be a predetermined secondary user input. When the input module 230 determines that the predetermined secondary user input has been received, the set display module 240 modifies the display of the subset of elements by displaying a different subset of elements. In an example, the set display module 240 may display a new subset of elements that are adjacent in a consecutive sequence to the current subset of elements. In another example, the set display module 240 may display a subset of elements that are located in an adjacent level in a hierarchy to the originally displayed subset of elements. In another example, upon receiving a predetermined secondary user input, the set display module 240 may only change one or more, but not all, of the elements in the subset of elements. In this example, the set display module 240 may keep the element of the subset corresponding to the designated element displayed by the element display module 220.

In other cases, the further predetermined user input may be a predetermined element quantity user input. When the input module 230 determines that the predetermined element quantity user input has been received, the set display module 240 modifies the display of the subset of elements by modifying the number of elements in the current subset of elements which are displayed. The set display module 240 may either increase or decrease the number of elements in the current subset of elements. When changing the number of elements in the subset of elements, the set display module 240 may correspondingly modify the size of the elements, the position of the elements, the shape of the elements or the amount of data, metadata or information displayed with the elements, such that the new subset of elements fits within the display 250 and are generally viewable to a user.

Figure 6:
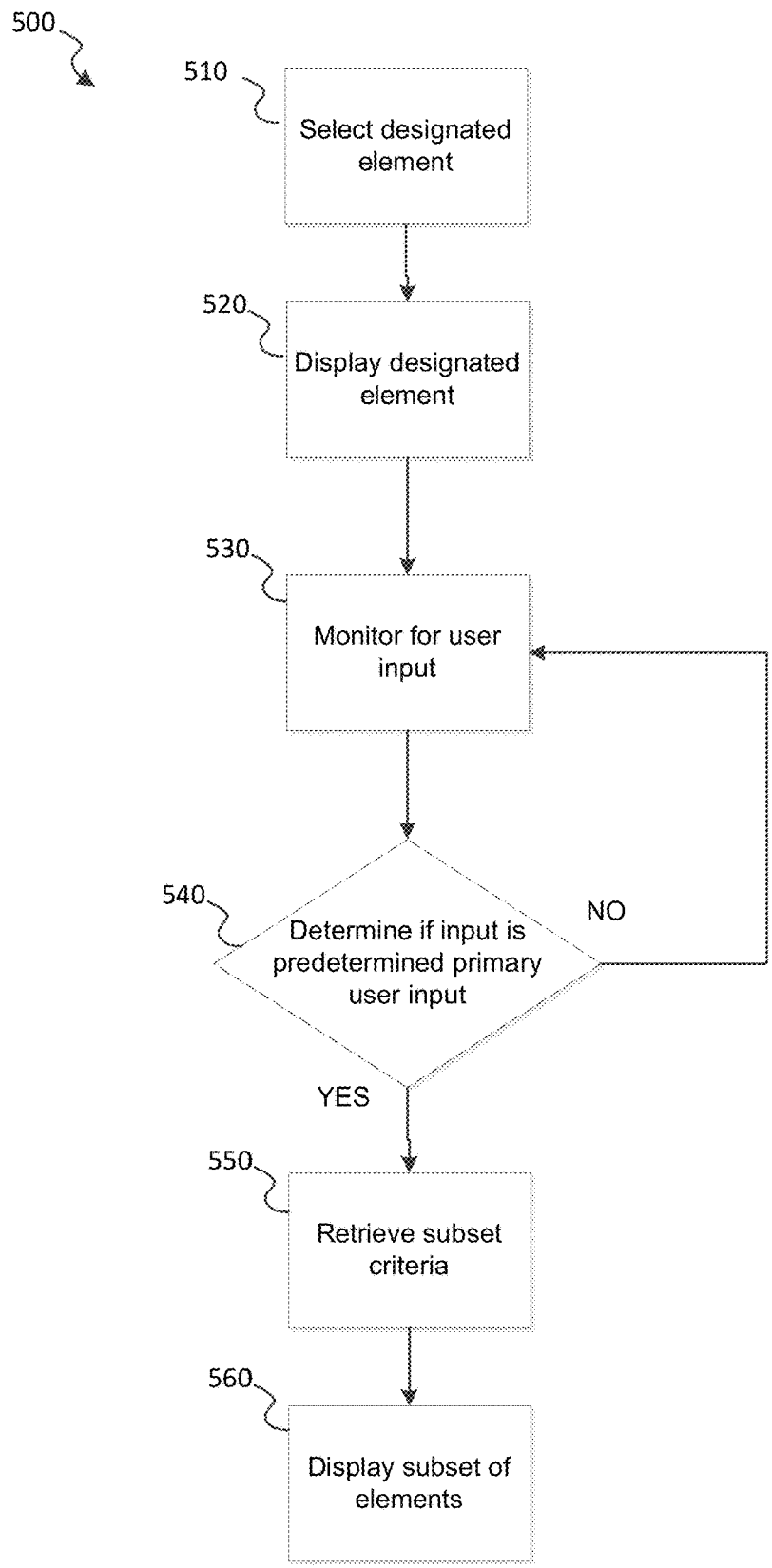
FIG. 6 is a flowchart illustrating a method for element navigation with criteria retrieval according to a further embodiment.

FIG. 6 is a flowchart illustrating a method 500 for element navigation with criteria retrieval according to an embodiment.

At 510, a designated element from a list of elements is selected. The designated element may be selected by a user or selected automatically by a processor based on predetermined criteria.

At 520, a designated element is displayed by the element display module 220. At 530, the input module 230 monitors for a user input. At 540, the input module 230 determines whether the input received was a predetermined primary user input. If the input received was not the predetermined primary user input, then the input module 230 monitors for user input at 520. At 550, if the input received by the input module 230 was the predetermined primary user input, the set display module retrieves subset criteria stored in the database 210. The subset criteria may be determined by a user or automatically determined based on predetermined criteria. At 560, the set display module 240, in view of the subset criteria, displays a subset of elements, from a set of elements, while the element display module 220 is displaying the designated element.

In some cases, the subset criteria are selection criteria. The selection criteria may be used by the set display module 240 to determine which elements will be included in the subset of elements. The selection criteria may be preselected by a user or preselected automatically based on predetermined criteria. The selection can, but need not, include elements from the same part of a consecutive sequence or the same part/level of a hierarchy. The selection criteria, for example, may be based on user preferences, relevancy, historical usage, contextual usage, or the like.

In some cases, the subset criteria are display criteria. The display criteria may be used by the set display module 240 to determine the number of elements to be included in the subset of elements. The display criteria may be based on, for example, user preferences, relevancy, historical usage, display size, display resolution, metadata quantity, or the like.

Figure 7A:
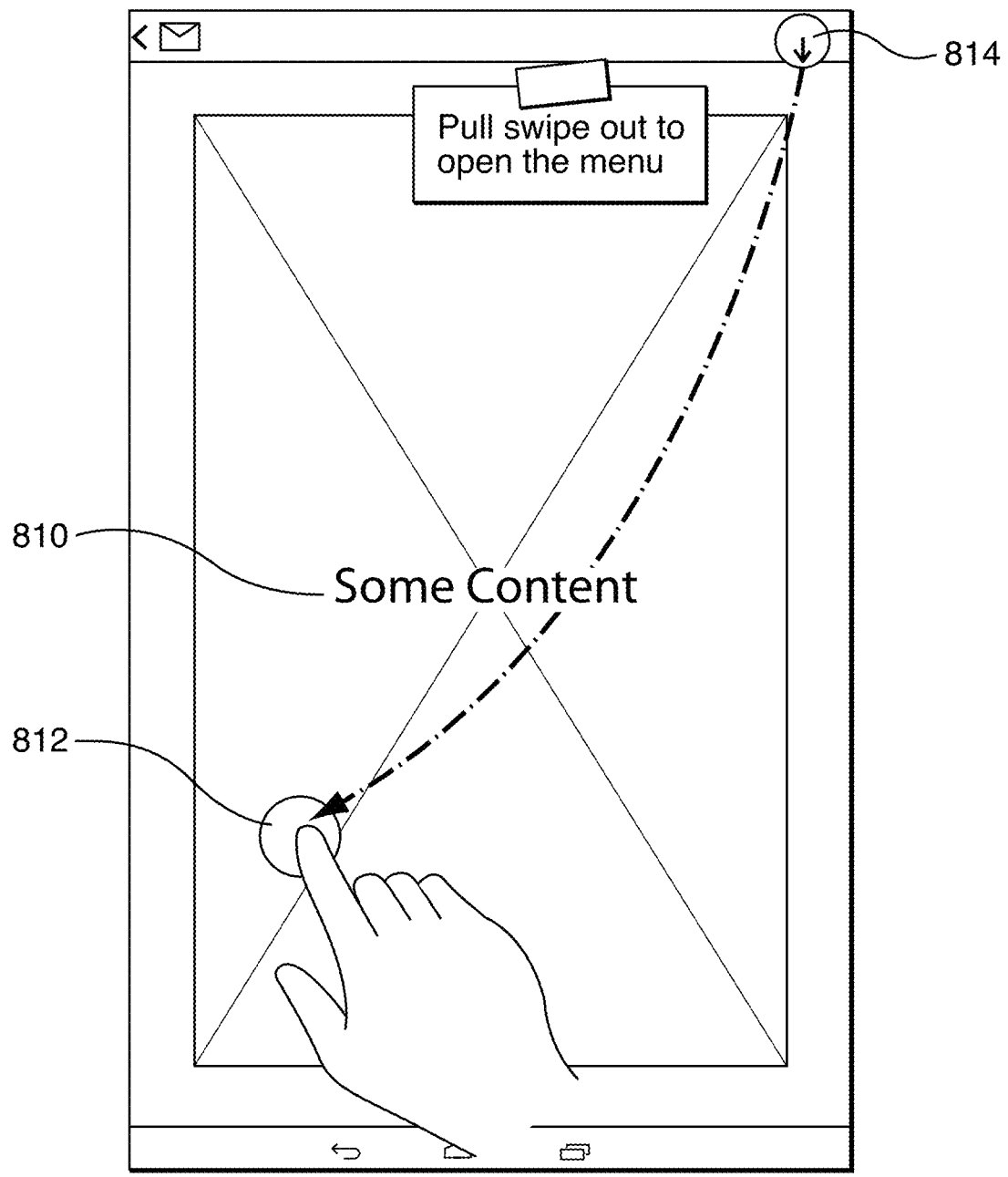
FIG. 7A illustrates an example of predetermined primary user input for initiating element navigation according to an embodiment.

FIGS. 7A-7E illustrate an example operation of a system and method for element navigation. In this example, a user is navigating a database of students on a smartphone with a touchscreen display. Turning to FIG. 7A, 'some content' 810 regarding, for example, a class or student is displayed by the element display module 220 as the designated element on the touchscreen; for example, the content 810 may be the student's picture and academic biography. The user initiates the set display module 240 by providing a predetermined primary user input 812 to the input module 230 by swiping their finger starting from the top-right region of the screen 814 towards the bottom-left region 832 of the display 250. This primary user input 812 initiates a display of a subset of elements related to the designated element, for example, from a list or hierarchical structure.

Figure 7B:
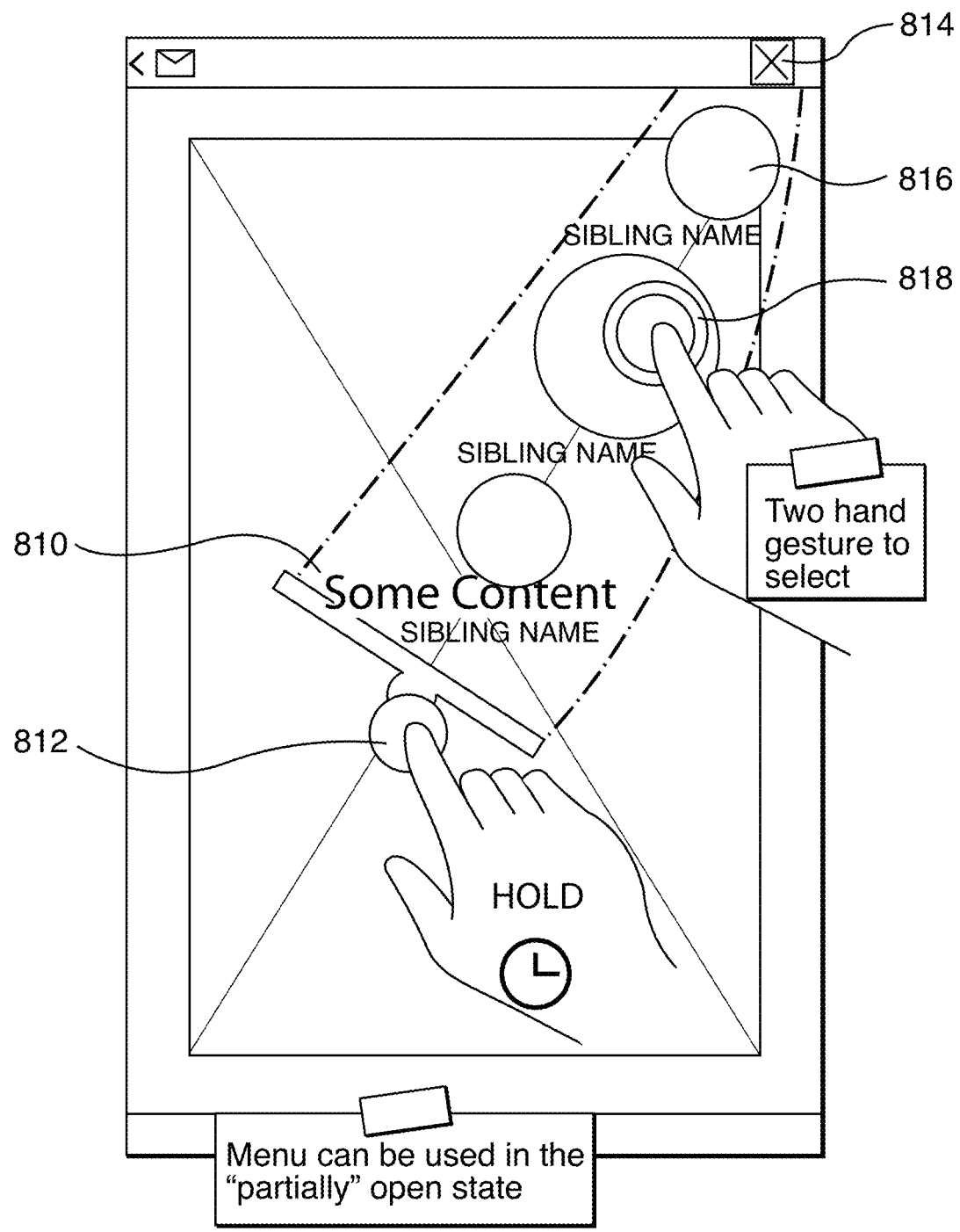
FIG. 7B illustrates an example of a subset of elements in a partially open state.

Turning to FIG. 7B, in some cases, while in the process of providing the predetermined primary user input 812 to the input module 230, the user may also have access to the elements 816 in the subset of elements which are displayed between the top right of the touchscreen 814 to the current location of the finger touch input associated with the primary user input 812. The system 200 in this state may be referred to as being in a "partially open state". The displayed elements may be selected 818 with the user's other hand, or other fingers on the same hand, while the user's original hand maintains the finger touch input. Although FIG. 7B illustrates a secondary right hand and index finger, it will be understood that other digits or another hand may be used.

Figure 7C:
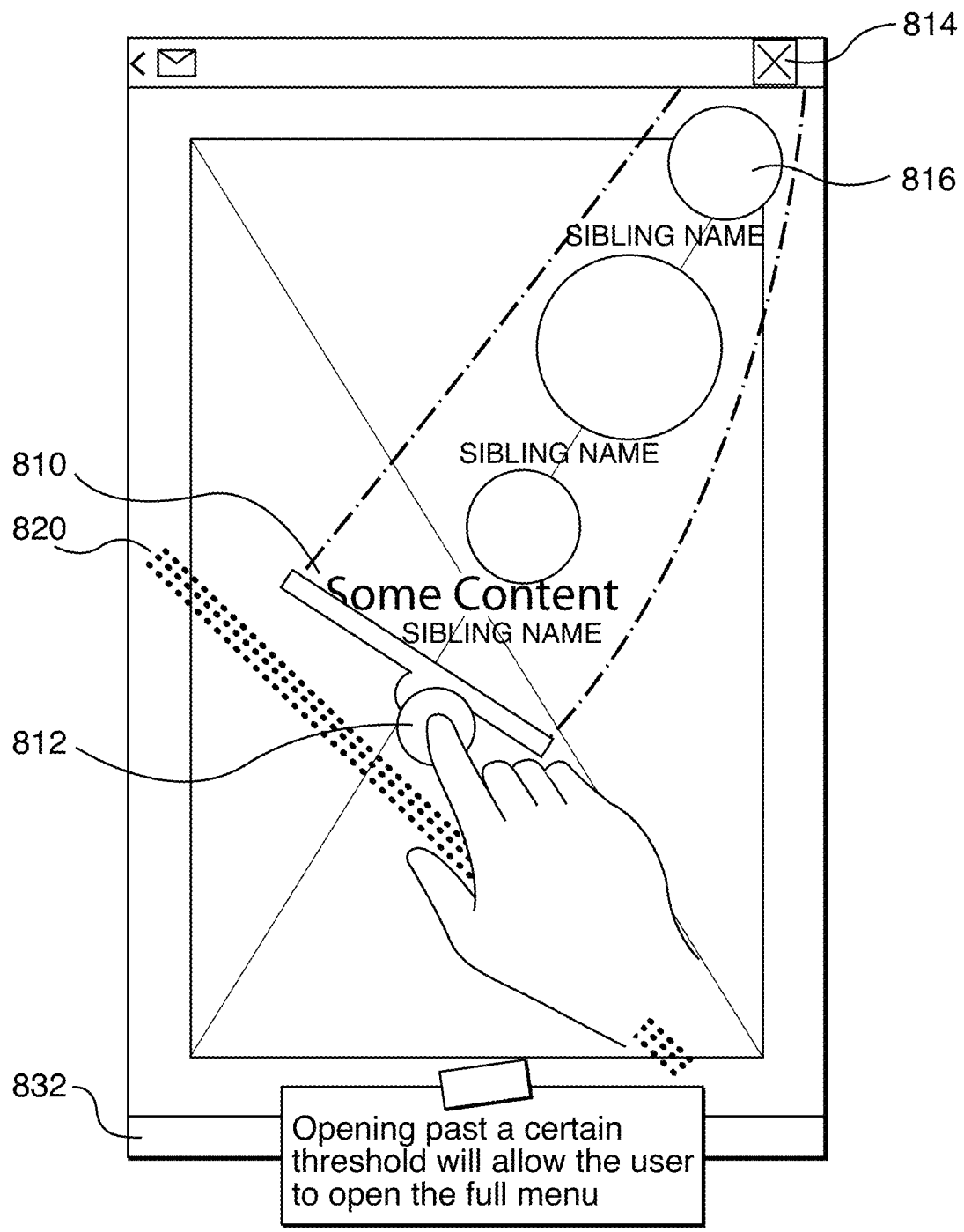
FIG. 7C illustrates an example of predetermined primary user input with a threshold for element navigation according to an alternative embodiment.

Turning to FIG. 7C, in some cases, when the predetermined primary user input 812 to the input module 230 passes a predetermined threshold 820, the set display module 240 will have the display of the subset of elements 816 in a "locked open state". In this state, the subset of elements 816 will be displayed by the set display module 240 even after removal of the predetermined primary user input 812. Note that the predetermined threshold 820 may or may not be actually displayed by the display 250. In this example, the user starts a finger swiping input 812 in the top-right corner region of the screen 814. Once the finger swipe 812 passes a threshold 820, at approximately three-quarters of the way between the top-right corner 814 and the bottom-left corner of the screen 832, the subset of elements 816 are in a locked open state. The user may then remove his finger and the set display module 240 will keep displaying the subset of elements 816. The set display module 240 may cease displaying the subset of elements 816 when a predetermined close input is received by the input module 230. The predetermined close input may be, for example, receiving an input in a specific region of a display 250, a specific input motion, or the like. In this example, the predetermined close input is receiving a touch input in the top-right corner of the screen 814.

Figure 7D:
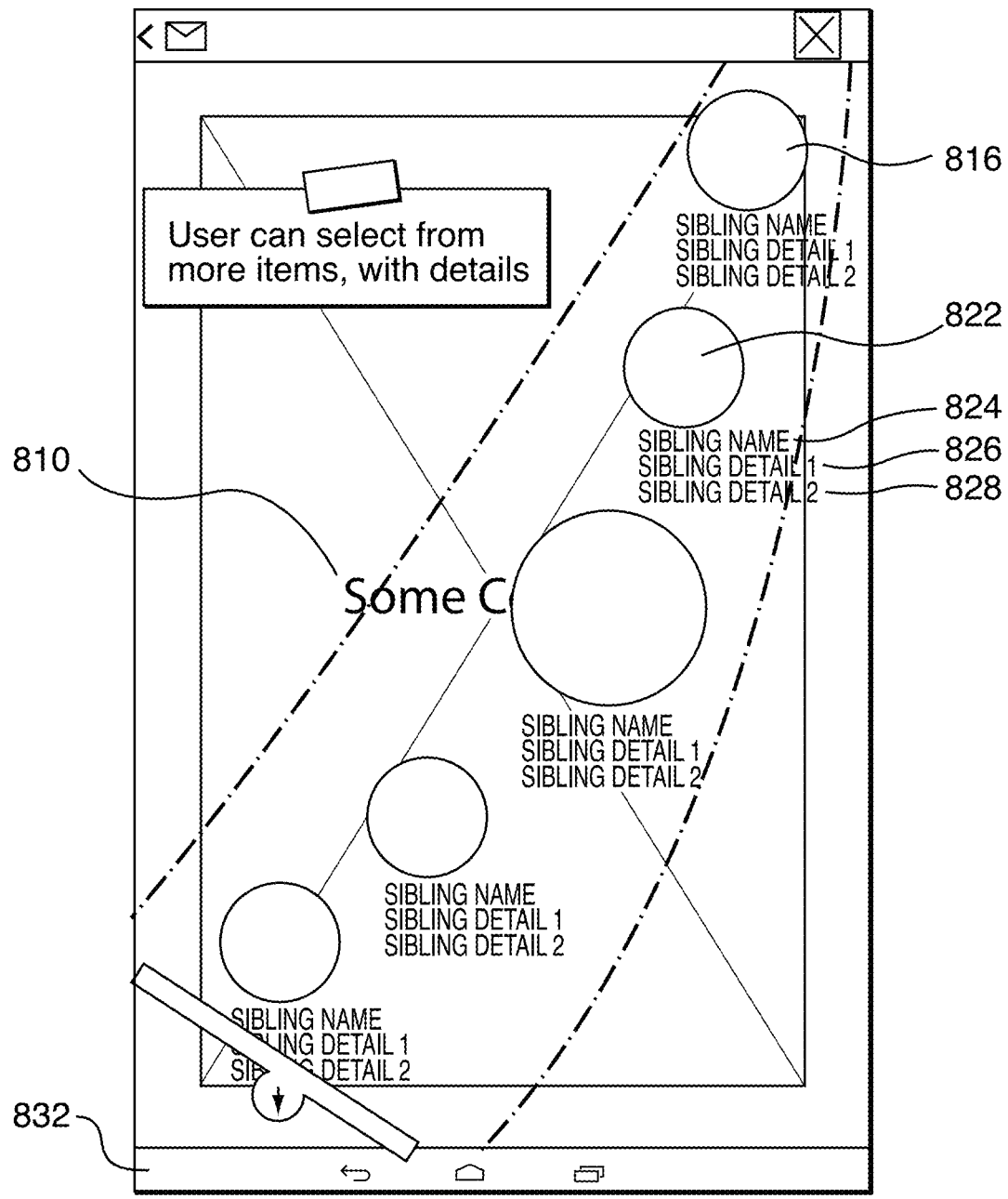
FIG. 7D illustrates an example of a subset of elements in a locked open state.

Turning to FIG. 7D, a subset of elements 816 displayed by the set display module 240 in a locked open state is shown. In this example, each element in the subset of elements 816 represents a student. Each student is presented as an icon 822 with three lines of corresponding metadata 824, 826, 828; for example, the student's name, birthdate and grade.

Figure 7E:
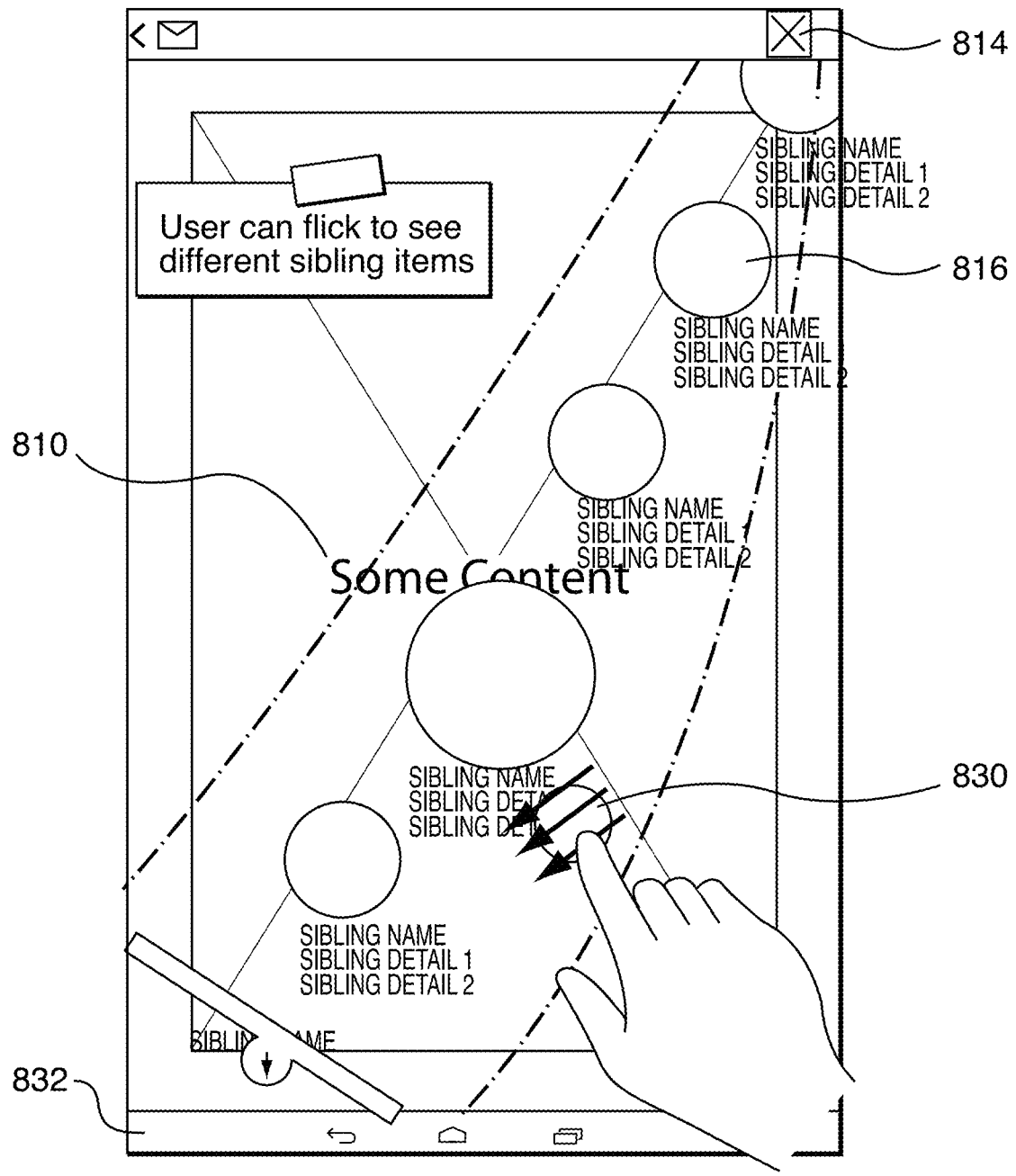
FIG. 7E illustrates an example predetermined secondary user input for element navigation.

Turning to FIG. 7E, the illustration indicates that the user can view a different subset of elements 816, in this example students, by providing a predetermined secondary user input 830 to the input module 230. In this example, the predetermined secondary user input 830 is a short swiping input towards the bottom-left corner of the screen 832. This motion causes additional elements from the subset of elements 816 to move along the path while earlier elements from the subset of elements 816 move off the screen to the bottom left.

An example of the use of an embodiment of the system and method described herein is for element navigation on a learning management system. In this example, a teacher would like to grade essays from multiple students in his class using the learning management system. The teacher accesses the learning management system through a tablet device. Each of the students' essays represents a list element in the learning management system. The element display module 220 may display on the tablet's screen the content of an essay which the teacher is currently grading. In order to ensure that the mark given for the currently displayed essay is consistent with the marks given to other previously marked essays, the teacher can input a predetermined primary user input into the input module 230 by swiping from the top-right corner of the screen towards the bottom-left corner of the screen. This predetermined input will cause the set display module 240 to display a subset of recently graded essays partially overlying of the currently displayed essay.

As well, in order to view how many more essays the teacher has left to grade, without losing the current essay displayed by the element display module 220, the teacher can repeatedly input a predetermined secondary user input into the input module 230 to change the subset of essays displayed by the set display module 240. The predetermined secondary user input may be a swiping motion input starting at the middle of the screen and ending near the bottom-left corner of the screen. While changing the subset of students (and essays) displayed, the teacher can view the condition indicator of each element, which in this case may indicate a condition of graded or not graded. The ability to have a designated element displayed while a subset of elements is displayed is intended to be beneficial to the operability of using and navigating electronic content; especially electronic content organized in a list. In this example, having the subset of elements displayed may also allow the teacher to plan his/her time marking the current essay by seeing how many more essays are left to mark.

In another example of the use of an embodiment of the system and method described herein, a worker would like to compose an email on her personal computer workstation. The personal computer includes a monitor such as the display 250 and a mouse input as the input module 230. Previously sent emails represent list elements in the sent mail folder of an email mailbox hierarchy. The element display module 220 may display on the monitor the content of a current email which the worker is currently reviewing. To compare the contents of the current email with other emails recently sent, the worker can input a predetermined primary user input into the input module 230. The predetermined primary user input may include clicking the mouse with the cursor at the middle-left region of the monitor and dragging the cursor to the middle-right region of the monitor. This predetermined input will cause the set display module 240 to display a subset of the most recently sent emails partially overlaying the current email.

Also, the worker may want to view emails from a different folder in the email mailbox hierarchy without losing the current email displayed by the element display module 220. The worker can input a predetermined secondary user input into the input module 230 to move up a level in the hierarchy and have the set display module 240 display the folders of the email mailbox as the subset of elements. The predetermined secondary user input may be clicking the mouse with the cursor at the middle of the screen and dragging the cursor down near the bottom of the screen. The condition indicator of each element can display whether there are unviewed elements in each folder of the mailbox. In this example, the worker can more easily compose her email with contextual information from other emails easily available without losing the display of her email.

In the preceding description, for purposes of explanation, numerous details are set forth in order to provide a thorough understanding of the embodiments. However, it will be apparent to one skilled in the art that these specific details may not be required. In other instances, structures may be shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for element navigation, the method comprising:
    selecting a designated element from a plurality of elements wherein the plurality of elements comprises a hierarchical structure of elements;
    displaying the designated element on a display of an electronic device; monitoring for a predetermined primary user input from an input module, wherein the primary user input comprises receiving a user touch input originating from a first predetermined region of the display and ending in a second predetermined region of the display;
    displaying an initial set of elements in a locked open state, the initial set of elements being related to the designated element overlaid on the display of the designated element, and from a different level of the hierarchy; and
    monitoring for a predetermined secondary user input, while the primary user input is maintained, wherein the predetermined secondary user input is a flick that moves a subset of elements along a path.

2. A method according to claim 1, wherein the plurality of elements comprises a list of elements, and the initial set of elements related to the designated element comprises a subset of elements from the list of elements.

3. A method according to claim 1, the method further comprising:
    monitoring for a further predetermined secondary user input after the primary user input has ended; and
    upon receiving the predetermined secondary user input, performing a secondary action related to the set of elements.

4. A method according to claim 3, wherein the secondary action is selected from the group consisting of:
    ceasing display of the initial set of elements;
    ceasing display of the initial set of elements and of the designated element, and displaying a newly selected element as the new designated element, the selected element selected by the predetermined secondary user input; and
    ceasing display of the initial set of elements and displaying a new set of elements.

5. A method according to claim 4, wherein the plurality of elements comprises a list of elements, and the initial set of elements comprises a subset of elements from the list of elements, and wherein the new set of elements are adjacent elements in the list of elements to the initial set of elements.

6. A method according to claim 4, wherein displaying a new set of elements comprises changing the number of elements displayed compared to the initial set of elements.

7. A method according to claim 6, wherein changing the number of elements displayed comprises:
    retrieving predetermined display criteria for selecting the number of elements displayed; and
    displaying the set of elements based on the display criteria.

8. A method according to claim 7, wherein the display criteria is selected from the group consisting of user preferences, relevancy, historical usage, display size, display resolution and metadata quantity.

9. A method according to claim 1, wherein displaying the set of elements further comprises displaying predetermined metadata about each element of the set of elements.

10. A method according to claim 9, wherein the metadata comprises a predetermined status indicator related to a task related to the plurality of elements.

11. A method according to claim 1, wherein displaying the set of elements further comprises:
    retrieving predetermined selection criteria for selecting the initial set of elements; and
    displaying the set of elements based on the selection criteria.

12. A method according to claim 11, wherein the predetermined selection criteria is selected from the group consisting of user preferences, relevancy, historical usage, and contextual usage.

13. A method claim 1, wherein on receiving the input from the first predetermined region of the display, the initial set of elements are in a partially open state awaiting the predetermined secondary user input.

14. A system for element navigation, the system comprising:
- an element display module configured to display a designated element on an electronic device, the designated element selected from a plurality of elements wherein the plurality of elements comprises a hierarchical structure of elements;
- an input module configured to receive a predetermined primary user input, wherein the primary user input comprises receiving a user touch input originating from a first predetermined region of the display and ending in a second predetermined region of the display and is configured to monitor for a predetermined secondary user input, while the primary user input is maintained, wherein the predetermined secondary user input is a flick that moves a subset of elements along a path; and
- a set display module configured to display an initial set of elements in a locked open state, the initial set of elements being related to the designated element, and from a different level of the hierarchy, upon the input module receiving the predetermined primary user input, the initial set of elements overlaid on the display of the designated element.

15. A system according to claim 14, wherein the plurality of elements comprises a list of elements, and the initial set of elements related to the designated element comprises a subset of elements from the list of elements.

16. A system according to claim 14 wherein the set display module is further configured to display predetermined metadata about each element of the set of elements.

17. A system according to claim 16 wherein the secondary action is selected from the group consisting of:
- the set display module ceasing display of the initial set of elements;
- the set display module ceasing display of the initial set of elements and the element display module ceasing display of the designated element, and the element display module displaying a selected element as the designated element, the selected element selected by the predetermined secondary user input; and
- the set display module ceasing display of the initial set of elements and displaying a new set of elements.

18. A system according to claim 14 wherein the input module is further configured to receive a further predetermined secondary user input after the primary input has ended, and upon receiving the predetermined secondary user input, the element display module, the set display module, or both, perform a secondary action.

* * * * *